United States Patent [19]

Pedersen et al.

[11] Patent Number: 5,480,343

[45] Date of Patent: Jan. 2, 1996

[54] METHOD OF SHARPENING PROFILE-SHARPENED CUTTING BLADES

[75] Inventors: Harry Pedersen, Penfield; Charles G. Ellwanger, Rochester, both of N.Y.

[73] Assignee: The Gleason Works, Rochester, N.Y.

[21] Appl. No.: 185,580

[22] Filed: Jan. 24, 1994

Related U.S. Application Data

[63] Continuation-in-part of Ser. No. 23,273, Feb. 26, 1993, Pat. No. 5,305,558.

[51] Int. Cl.$^6$ .................................................. B24B 49/00
[52] U.S. Cl. ............................... 451/10; 451/14; 451/45; 451/57
[58] Field of Search ........................... 451/1, 10, 14, 451/48, 57, 242, 246, 249, 45

[56]  References Cited

U.S. PATENT DOCUMENTS

| | | | |
|---|---|---|---|
| 4,144,678 | 3/1979 | Ellwanger et al. | 451/48 |
| 4,186,529 | 2/1980 | Huffman | 451/4 |
| 4,260,299 | 4/1981 | Ryan et al. | 407/115 |
| 4,265,053 | 5/1981 | Kotthaus | 451/65 |
| 4,278,370 | 7/1981 | Spear | 407/115 |
| 4,463,524 | 8/1984 | Schott et al. | 451/281 |
| 4,550,532 | 11/1985 | Fletcher, Jr. et al. | 451/5 |
| 4,575,285 | 3/1986 | Blakesley | 407/115 |
| 4,992,008 | 2/1991 | Pano | 407/114 |
| 5,168,661 | 12/1992 | Pedersen et al. | 451/5 |

OTHER PUBLICATIONS

Pedersen et al., "Precision Profile Grinding for High Production", Society of Manufacturing Engineers, SME 1982 International Tool & Manufacturing Engineering Conference, May 17–20, 1982 MR82–246.

Primary Examiner—Maurina T. Rachuba
Attorney, Agent, or Firm—Robert L. McDowell; Ralph E. Harper

[57]  ABSTRACT

A method of sharpening cutting blades of the type made from bar stock type material, the method comprising producing relief surfaces on the cutting profile surface. The method comprises forming first and second relief surfaces on the cutting profile surface. The first relief surface extends from a location inward of the cutting edge to the back face and is oriented at a first relief angle with respect to a side surface. The second relief surface extends from the cutting edge to the first relief surface and is oriented at a second relief angle with respect to the side surface with the second relief angle being smaller than the first relief angle. The cutting blades may comprise a uniform cross-section and the cutting profile may include a protuberant portion adjacent the top surface of the cutting blades.

20 Claims, 7 Drawing Sheets

METHOD OF SHARPENING PROFILE-SHARPENED CUTTING BLADES

This application is a continuation-in-part of application Ser. No. 023,273 filed Feb. 26, 1993 now U.S. Pat. No. 5,305,558.

FIELD OF THE INVENTION

The present invention is directed to cutting blades for cutting gears and the like. Particularly, the present invention relates to a method of sharpening cutting blades made from bar stock type material to form a desired side surface thereon.

BACKGROUND OF THE INVENTION

Cutting blades for cutting gears and the like may be of many forms. One form widely used are cutting blades known as "stick blades" which are made from a length of material such as bar stock.

One example of cutting blades of the bar stock type are those blades known as "profile sharpened" blades. In these blades, the top surface, side profile surfaces, and, the cutting face (in some types), are ground to restore and resharpen the blades. In those types of blades not requiring sharpening of the front face, metallurgical coatings or other treatments which improve cutting and wear characteristics are usually included on the front face. Profile-sharpened cutting blades may be used to remove stock material from the outside or concave flank of a tooth slot (outside blade), the inside or convex flank of a tooth slot (inside blade), and/or the bottom portion of the tooth slot (bottom blade).

One type of profile-sharpened cutting blade that does not require the front face to undergo grinding during sharpening is disclosed in U.S. Pat. No. 4,260,299 to Ryan et al., this cutting blade comprises a base portion and a cutting end with the cutting end having a front rake surface arranged at a particular rake angle, a back face, top surface, cutting profile surface and clearance profile surface. The cutting and clearance edges are defined by the intersection of the front rake surface with the cutting profile surface and the clearance profile surface, respectively.

Another known type of profile-sharpened cutting blade not requiring the front face to be ground during sharpening is shown in U.S. Pat. No. 4,575,285 to Blakesley. This blade also comprises a base portion and cutting end. The cutting end includes a front rake surface, a back face, opposing side surfaces, top surface, and opposing cutting and clearance profile surfaces which at their intersection with the front rake surface form, respectively, cutting and clearance edges. The cutting blade further includes a slot extending the length of the blade through the front rake surface and intersecting the clearance profile surface which intersection forms a second cutting edge. This second cutting edge removes metal from the side of a tooth slot opposite the side being cut by the cutting edge formed on the cutting profile surface.

Yet another type of profile-sharpened cutting blade not requiring the front face to be ground during sharpening is disclosed in commonly assigned, copending application Ser. No. 036,312 to Blakesley et al. The cutting blade comprises a generally uniform cross-section along its length and includes opposite end surfaces, a pair of opposed side surfaces, a back surface, and a front surface. The front surface includes a pair of mounting surfaces, a front rake surface, and a connecting surface. The front rake surface and the connecting surface are located between the mounting surfaces. The front rake surface extends from one of the pair of mounting surfaces and is oriented at a rake angle with respect thereto. The connecting surface extends from the other of the pair of mounting surfaces to the rake surface and intersects therewith.

The cutting blade includes a pressure side surface (also known as a cutting profile surface), a clearance side surface, and a top surface. The pressure side surface is oriented at a predetermined pressure angle with respect to a side surface and a cutting edge is defined by the intersection of the pressure side surface and the front surface. The clearance side surface is oriented at a predetermined clearance angle with respect to a side surface and a clearance edge is defined by the intersection of the clearance side surface and the front surface.

U.S. Pat. No. 4,265,053 to Kotthaus discloses form-ground profile-sharpened cutting blades of the type wherein along with the top surface and side profile surfaces, the front face also requires grinding during sharpening. The sharpening procedure employs three grinding discs each sharpening one of the inner profile surface, the outer profile surface, and the front face of the cutting blade.

A method of sharpening cutting blades having only top and side profile surfaces that require resharpening by utilizing a single grinding wheel to form grind the profile surfaces is disclosed in U.S. Pat. No. 4,144,678 to Ellwanger et al. and in Pedersen et al., "Precision Profile Grinding for High Production", SME 1982 International Tool & Manufacturing Engineering Conference, May 17–20, 1982, MR82-246.

U.S. Pat. No. 5,168,661 to Pedersen et al. teaches a method of sharpening profile-sharpened cutting blades by contour grinding the top and side profile surfaces on the blades by relative motion between the cutting blade and the grinding wheel.

In the stick-type cutting blades discussed above, generally those utilized as inside or outside blades, it is also known to include on the cutting profile surface, a protuberant portion adjacent the top surface and extending from the front rake surface to the back face. The protuberant portion is formed as a reduction in blade pressure angle for the purpose of creating an undercut when cutting gears, particularly pinion gears, in order to eliminate interference when running with their mating gear, such as during lapping or when in actual use.

In some contour-type sharpening processes for stick type cutting blades having this protuberant portion, it has been noticed that subsequent to final grinding of the cutting (pressure) profile surface, a hole or divot is present on the protuberant portion of the cutting edge at a point adjacent to its intersection with the cutting profile surface. The cause of this hole is believed to be due to the difference between the considerable amount of grinding force that is required when traversing the relatively large area of the cutting profile surface as opposed to the significantly smaller amount of grinding force that is utilized to commence grinding the relatively small area of the protuberant portion surface. The hole or divot on the cutting edge will be discussed in greater detail below.

The hole or divot may be reduced with slower feed rates during grinding of the cutting blade, however, any appreciable reduction in size of the hole requires increasing grinding time by about a factor of four which is unacceptable from a production standpoint.

It is an object of the present invention to provide a process in which profile-sharpened stick-type cutting blades of the types discussed above may be ground without the formation of a hole or divot in the cutting edge at the intersection of the cutting profile surface and the protuberant portion.

It is an object of the present invention to provide a sharpening process for profile-sharpened stick type cutting blades wherein the hole or divot is eliminated without a significant increase in length of process time.

It is another object of the present invention to grind stick-type cutting blades having no protuberant portion by the inventive process.

It is a further object of the present invention to provide stick-type cutting blades having a cutting profile surface ground in accordance with the present inventive process.

SUMMARY OF THE INVENTION

The present invention is directed to a method of sharpening profile-sharpened cutting blades of the type made from a length of bar stock material, and cutting blades made according to the inventive method.

One type of cutting blades sharpened by the present inventive method are those having a base portion and a cutting end. The cutting end includes a front rake surface, a back face, opposed side surfaces, a top surface, and a cutting surface extending between the front rake surface and the back face. A cutting edge is defined by the intersection of the front rake surface and the cutting surface. The cutting surface may include a protuberant portion located adjacent the top surface and extending between the front rake surface and the back face.

Another type of cutting blades sharpened by the present inventive sharpening process are cutting blades comprising a uniform cross-section along their length such as disclosed in previously discussed copending application Ser. No. 036,312 to Blakesley et al. The cutting surface may also include a protuberant portion located adjacent the top surface and extending between the front rake surface and the back face.

The inventive method includes forming first and second relief surfaces on the cutting profile surface, preferably by grinding. The first relief surface extends from a location inward of the cutting edge to the back face and is oriented at a first relief angle with respect to one of the opposed side surfaces. The second relief surface extends from the cutting edge to the first relief surface. i.e. the location inward of the cutting edge, and is oriented at a second relief angle with respect to the same side of the opposed side surfaces as is the reference surface for the first relief angle. The second relief angle is less than the first relief angle.

The method of the present invention enables cutting blades produced thereby to have a longer useful life and in blades with the above-mentioned protuberant portion, essentially eliminates holes or divots formed during conventional grinding at the intersection of the protuberant portion and the cutting surface.

DETAILED DESCRIPTION OF THE INVENTION

The present invention will be discussed with reference to the preferred embodiments as illustrated by the accompanying Figures.

Figure 1:
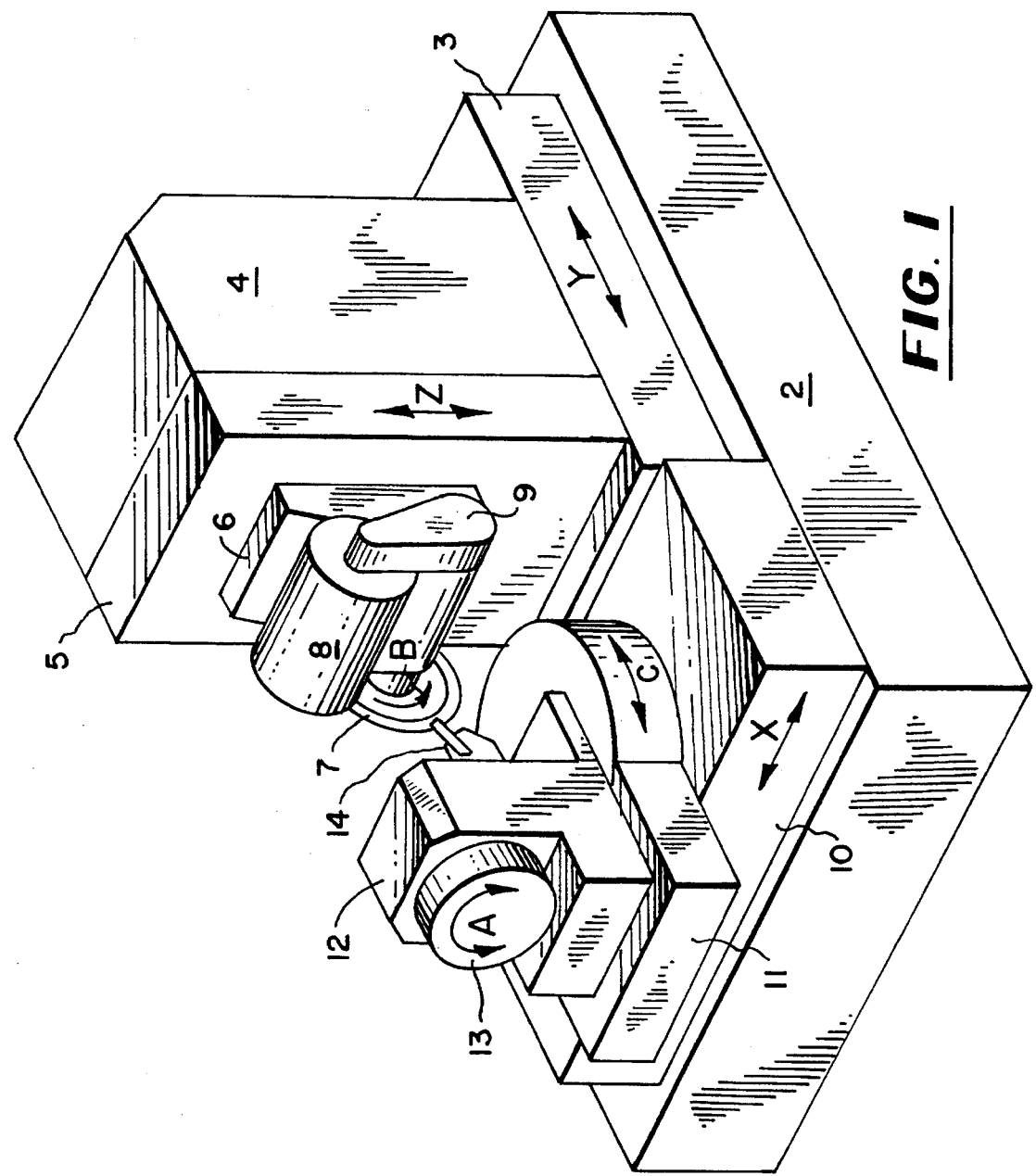
FIG. 1 is a schematic representation of a machine for carrying out the present inventive process.

A preferred sharpening or grinding machine for carrying out the present invention is schematically shown in FIG. 1. The machine is of the contour grinding type and is one having computer numerical control (CNC) and is described below. Such machines are well known in the art and are readily available.

The machine comprises a base 2 upon which a tool carriage 3 is mounted via slides or ways (not shown). The tool carriage 3 is movable on the slides along the machine base 2 in a direction Y (Y-axis). Located on tool carriage 3 is a tool column 4 to which is mounted tool slide 5, via ways or slides (not shown), for movement in a direction Z (Z-axis) perpendicular to the Y-axis movement of tool carriage 3. A tool head 6 is secured to tool slide 5 and an appropriate stock removing tool, such as a grinding wheel 7, is mounted for rotation to the tool head 6. The grinding wheel 7 is rotatable about an axis B and is driven by a motor 8 acting through suitable reduction gearing 9.

Also mounted via slides or ways (not shown) to machine base 2 is a first workpiece carriage 10 which is movable along the machine base 2 in a direction X (X-axis) perpendicular to both the Y-axis and Z-axis movements. A second workpiece carriage 11 is pivotally mounted to the first workpiece carriage 10 and is pivotable about an axis C. Secured to the second workpiece carriage 11 is workpiece column 12 in which a spindle (not shown) is journaled for rotation about axis A and is driven by motor 13. A blade holder 14 is releasably mounted to the spindle for rotation about the A-axis.

Relative movement of the tool 7 and blade holder 14 along each of the mutually perpendicular axes X, Y, and Z is imparted by respective drive motors (not shown) which act through speed reducing gearing and recirculating ball screw drives (not shown). Pivoting of the second workpiece carriage 11 about the C-axis is imparted by a drive motor (not shown) acting through a worm which engages with a worm wheel carried by the pivotable workpiece carriage Each of the respective drive motors, except the tool drive motor 8, is associated with either a linear or rotary encoder as part of a CNC system which governs the operation of the drive motors in accordance with input instructions input to a computer. The encoders provide feedback information to the computer concerning the actual positions of each of the movable machine axes. CNC systems for controlling the movement of multiple machine axes along prescribed paths are now commonplace. Such state-of-the-art systems are incorporated in the machine to control movements of selected axes along selected paths for sharpening stick-type cutting blades in accordance with the present inventive process.

Figure 2:
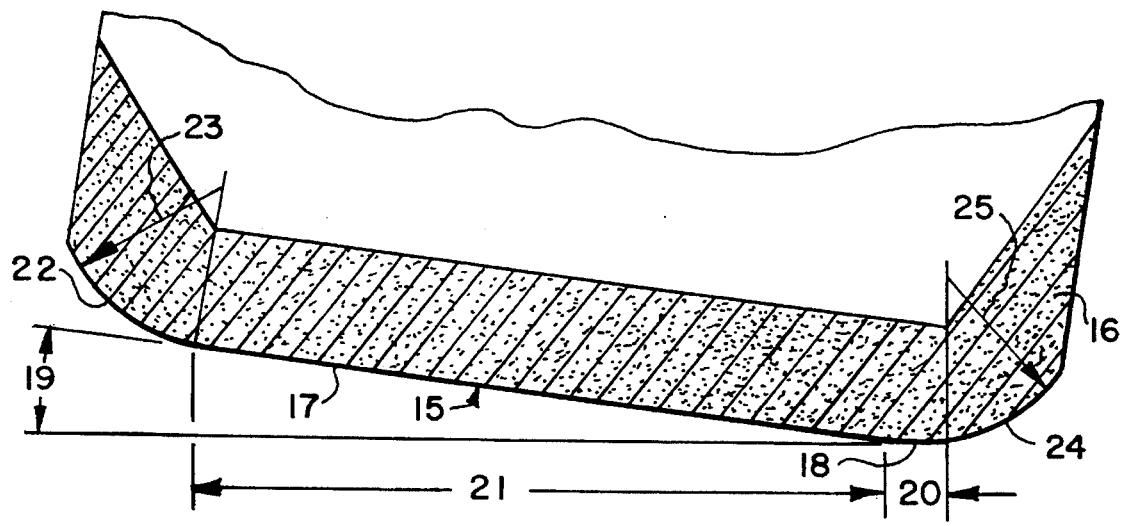
FIG. 2 illustrates a cross-section of a preferred grinding wheel for performing the present inventive process.

FIG. 2 illustrates a preferred grinding wheel for carrying out the present invention and is of the type disclosed in the aforementioned U.S. Pat. No. 5,168,661. The grinding wheel has a grinding profile 15 comprising abrasive material 16 located on a face thereof. The grinding profile 15 comprises an inner conical surface 17 and an adjacent outer narrow substantially flat portion 18. Inner conical portion 17 is inclined with respect to the adjacent outer narrow substantially flat surface 18 at an angle 19 which is relatively small, for example, generally about 4 degrees to about 12 degrees and preferably about 5 degrees to about 8 degrees. The inner conical surface 17 is substantially wider than the adjacent outer narrow substantially flat surface 18. The width 20 of the outer narrow substantially flat surface 18 is up to about 0.050 inches (1.270 mm) and preferably about 0.030 inches (0.7620 mm), the minimum width being a width greater than a single grain of abrasive or greater than about 0.004 inches (0.1016 mm). The width 21 of the inner conical surface 17 is determined by the maximum depth of stock material to be removed from the cutting blade divided by the tangent of angle 19 and is generally about 0.30 inches (7.620 mm) to about 0.40 inches (10.160 mm).

The grinding profile 15 further includes an inner arcuate grinding surface 22 having radius 23 located inwardly of inner conical surface 18 and an outer arcuate grinding surface 24 having radius 25 located outwardly of outer narrow substantially flat surface 18. The radius 25 of the outer arcuate grinding surface 24 is generally about 0.060 inches (1.524 mm) to about 0.100 inches (2.540 mm) and the radius 23 of the inner arcuate grinding surface 22 is about 20% to about 40% larger than radius 25.

Figure 5:
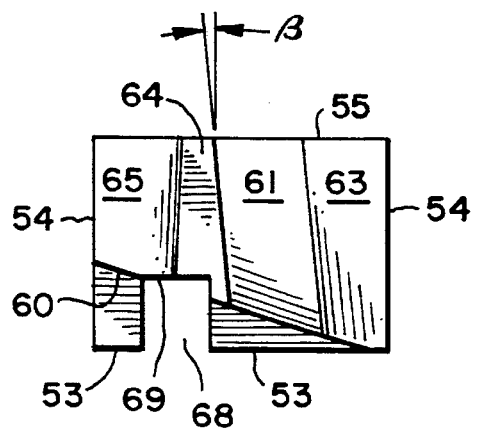
FIG. 5 is an enlarged top view of the cutting blade of FIGS. 3 and 4.
Figure 3:
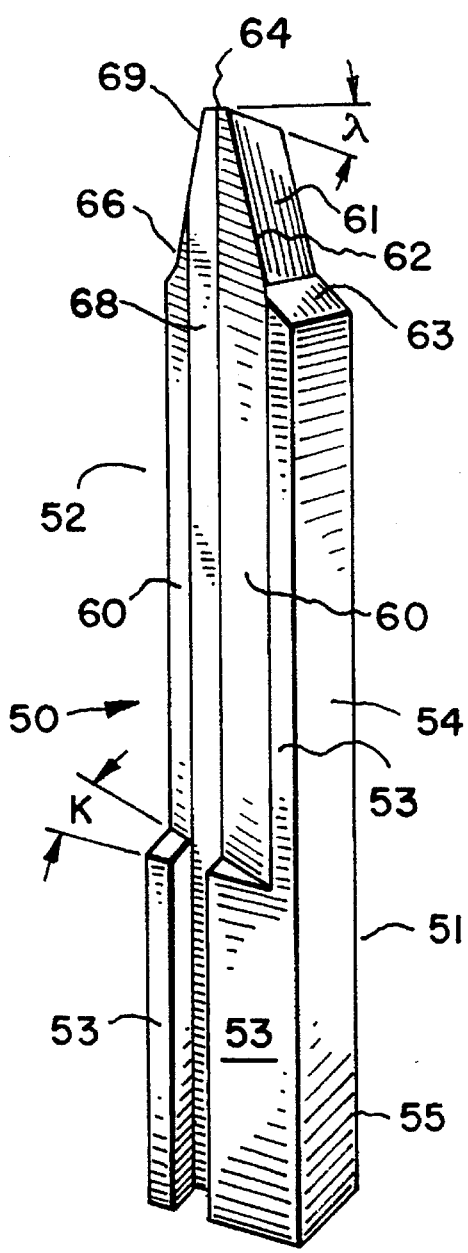
FIG. 3 is an isometric view of a conventional type of cutting blade formed from bar stock material.
Figure 4:
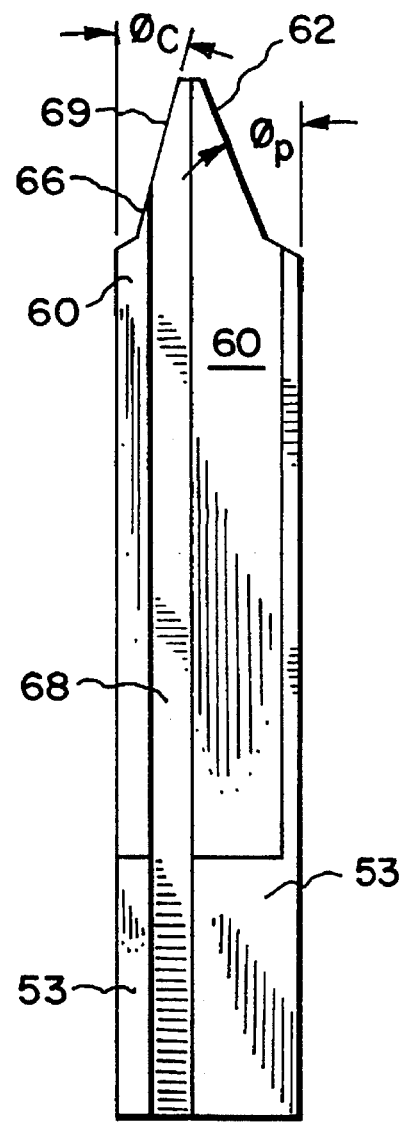
FIG. 4 is a front view of the cutting blade of FIG. 3.

FIGS. 3, 4, and 5 illustrate a known type of cutting blade 50 made from a length of bar stock material, such as M2 high speed steel, and used primarily in face hobbing processes. A cutting blade of this type is disclosed in previously mentioned U.S. Pat. No. 4,575,285. The cutting blade 50 comprises a base portion 51 having a front surface 53, opposing side surfaces 54, and back face 55.

Cutting blade 50 further includes a cutting end 52 comprising front rake surface 60 oriented at rake angle K, cutting profile surface 61, cutting edge 62 at the intersection of rake face 60 and cutting profile surface 61 and oriented at pressure angle $\phi_p$, shoulder surface 63, and top surface 64 having top relief angle λ. Clearance edge 66 is formed by the intersection of front rake face 60 and clearance profile surface 65 (FIG. 5) and is oriented at a clearance angle $\phi_C$. Relief of the cutting profile surface 61 is provided as is shown in FIG. 5. The relief angle being shown as angle β. The magnitude of the blade angles are dependent on the particular workpiece being cut.

Cutting blade 50 also includes a slot 68 extending the length of the blade. The face of slot 68 is oriented at a rake angle differing from angle K and forms secondary cutting edge 69 at the intersection of slot 68 and clearance profile surface 65. Secondary cutting edge 69 cuts a portion of the bottom of a tooth slot as well as a portion of the flank opposite of that being cut by cutting edge 62.

Figure 6:
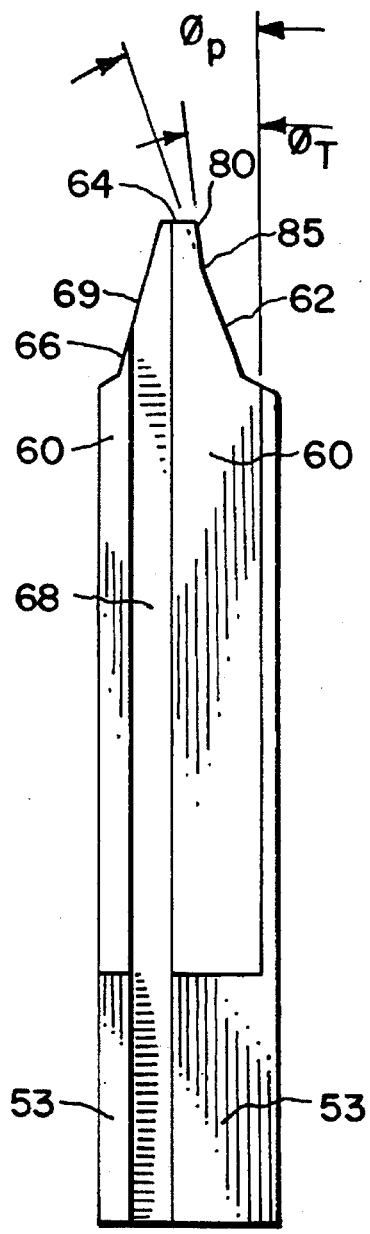
FIG. 6 is a front view of a cutting blade of the type shown in FIG. 3 and including a protuberant portion adjacent the top surface.
Figure 7:
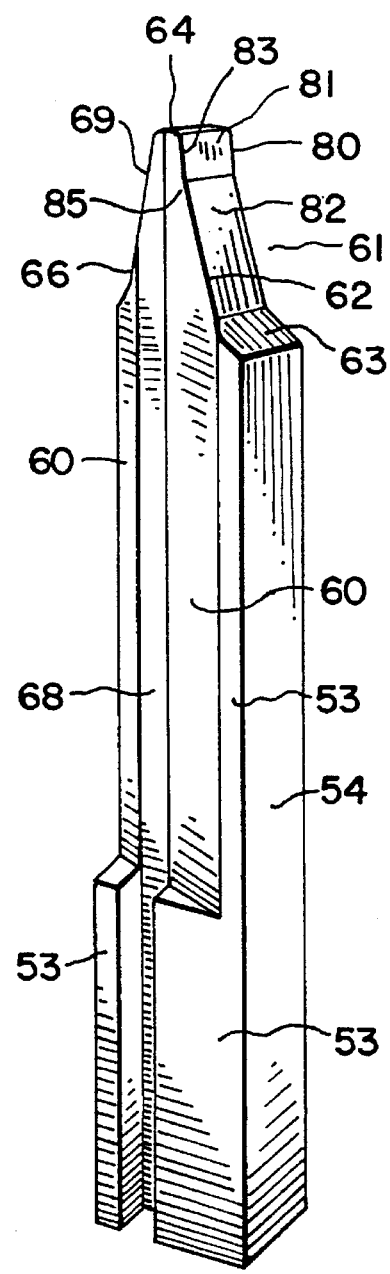
FIG. 7 is an isometric view of the cutting blade shown in FIG. 6.

FIGS. 6 and 7 illustrate a cutting blade as shown in FIGS. 3–5 with the inclusion of a known protuberant portion 80 comprising a profile surface 81 and located adjacent top surface 64. With the inclusion of this feature, the cutting profile surface 61 comprises two portions, a first portion 81 defined by profile surface of the protuberant portion 80, and a second portion 82 defined by the remainder of cutting profile surface 61. Protuberant portion 80 is formed as a reduction in the pressure angle $\phi_P$ of the cutting profile surface 61 and it can be seen in FIG. 6 that the pressure angle, $\phi_T$, of protuberant portion 80 is less than the pressure angle of cutting profile surface 61. FIG. 7 shows that with the inclusion of protuberant portion 80, the entire cutting edge of the cutting blade is comprised of two sections, 62 and 83, having different pressure angles. Cutting blades with these protuberant portions 80 are utilized primarily in cutting the pinion member of a gear set to create a modest undercut at the bottom of the tooth surface thereby eliminating any interference of the pinion tooth with the top surfaces of the teeth of the mating gear member such as during lapping or in actual use.

Prior to the present invention, when cutting blades of the type shown in FIG. 3 were sharpened on machines such as the one shown in FIG. 1, two grinding passes along the entire thickness of the profile surface were normally performed on cutting profile surface 61. When these type of cutting blades include a protuberant portion 80, the first cutting profile portion 81 and the second profile cutting profile surface portion 82 were sharpened in separate steps since the position of the cutting blade relative to the grinding wheel must be readjusted to account for the different pressure angles of the cutting profile surfaces.

With cutting blades having a protuberant portion as shown in FIGS. 6 or 7 and being sharpened by conventional processes on contour-type grinding machines, a hole or divot has been encountered at the location of intersection of the first and second portions of the cutting profile surface at the cutting edge. This location is designated by the reference number 85 in FIGS. 6 and 7. This hole has the effect, during cutting of a tooth surface, of leaving small amounts of stock material on the tooth surface which results in undesirable contact characteristics of the gear in operation.

Figure 8A:
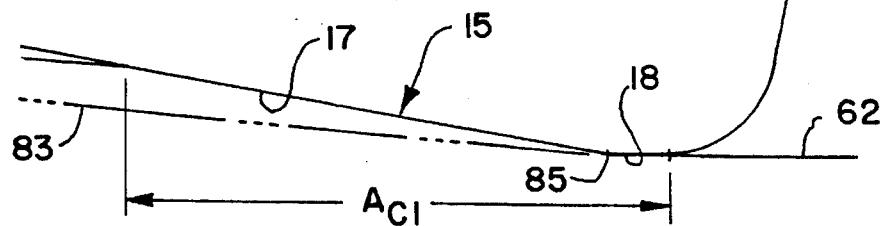
FIGS. 8(a), 8(b), 8(c), and 8(d) illustrate a conventional contour grinding sequence resulting in a hole being formed on the cutting edge.
Figure 8B:
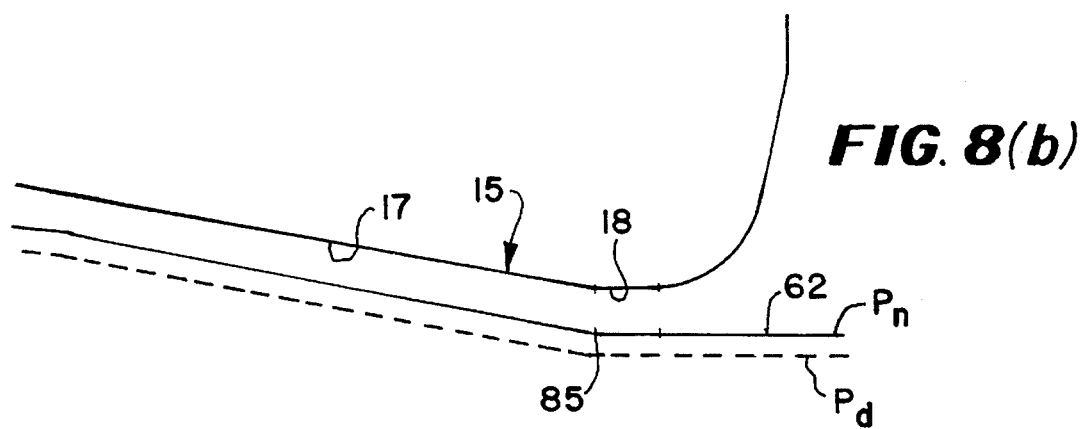

The cause of this hole is believed to be due to a variation in the contact force that exists between the surface of the grinding wheel and the cutting profile surface. While the cutting profile surface is being traversed along the face of the grinding wheel (FIG. 8a), a relatively large area of contact $A_{c1}$ exists between the grinding wheel and the blade. A certain unit pressure exists at this interface known as the threshold pressure. This is the pressure that must be reached before the abrasive grains of the grinding wheel will remove material from the blade. The summation of this pressure is a force that tends to deflect the blade away from the grinding wheel. After the grinding wheel reaches the point on the cutting profile surface where the protuberance portion begins, the blade is withdrawn from the grinding wheel in order to make a machine position change. When this withdrawal occurs, the cutting blade returns from a deflected position $P_d$ to an undeflected position $P_n$ (FIG. 8b).

Figure 8C:
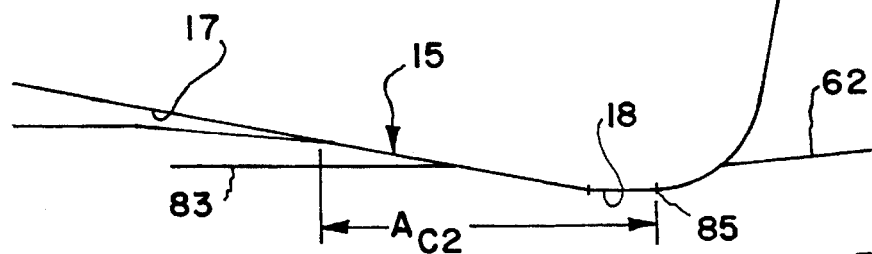
Figure 8D:

However, when the cutting blade is repositioned for grinding the surface of the protuberant portion (FIG. 8c) and the cutting blade is fed relatively into the grinding wheel by the same amount, the contact area $A_{c2}$ between the grinding wheel and the protuberant portion is now less than it had been. Therefore, the separating force is less and the grinding wheel cuts deeper into the cutting blade. As soon as the cutting blade begins to traverse relative to the grinding wheel, in order to complete the generation of the protuberant profile surface, the contact area begins to increase and the normal grinding force increases. This causes the cutting blade to spring away from the grinding wheel thus resulting in the hole 87 (FIG. 8d) at the cutting edge at the point where the grinding wheel initially contacted the protuberant profile portion.

The presence of such a hole has the effect of allowing stock material to remain on a tooth surface of a cut workpiece thus creating interference problems when the workpiece is run in mesh with its mating member. The maximum depth of the hole is about 0.00025–0.0008 inch (0.00635 mm–0.02032 mm), depending on the size of the cutting blade and the amount of surface area. As stated above, this hole results in stock material being left on the tooth flank of a cut gear which in turn prevents proper running characteristics with a mating member due to interference caused by the excess stock material on the tooth surface.

Figure 9:
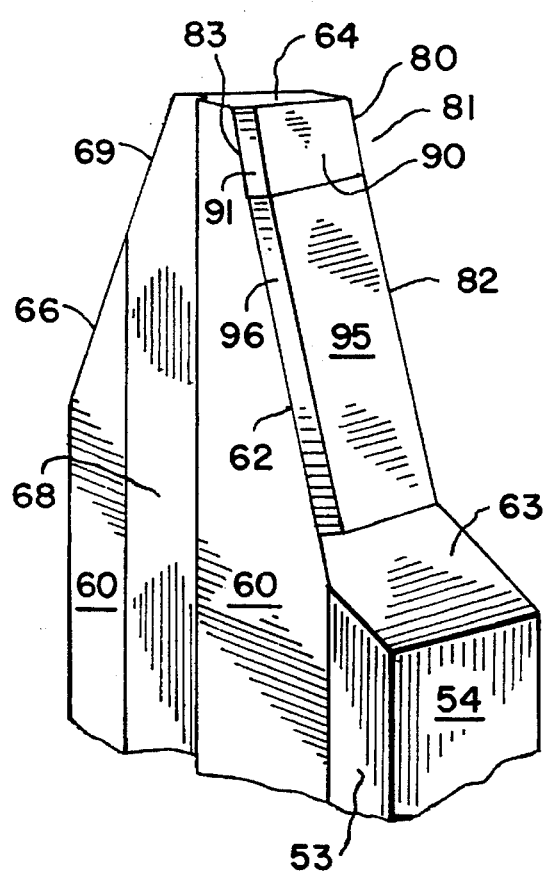
FIG. 9 is an enlarged view of the cutting end illustrating the inventive first and second relief surfaces on a cutting blade of the type shown in FIG. 7.
Figure 10:
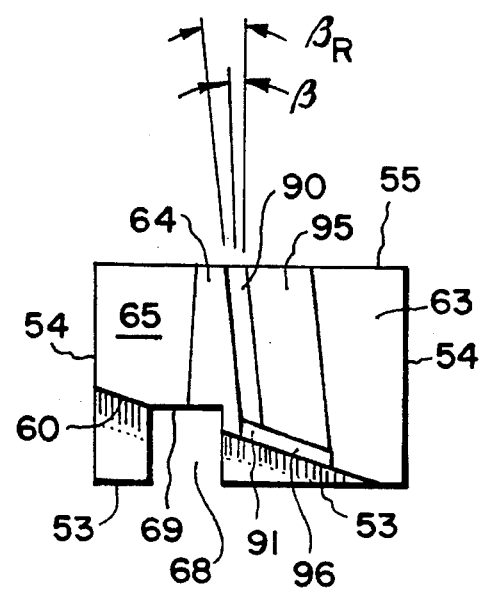
FIG. 10 is a top view of the cutting blade shown in FIG. 9.

FIGS. 9 and 10 show a profile-sharpened stick type cutting blade according to the present invention. Each cutting profile surface portion 81, 82, comprises two relief surfaces oriented at different angles with respect to either side surface 54. First cutting side profile portion 81 comprises first relief surface 90 and second relief surface 91. Second relief surface 91 is oriented at a relief angle $\beta$ which is the desired relief angle for the cutting profile surface of the cutting blade. First relief surface 90 is oriented at a different relief angle $\beta_R$ which is greater than second surface relief angle $\beta$.

Likewise, second cutting side profile portion 82 also includes two relief surfaces. Second relief surface 96 being oriented at relief angle $\beta$ and first relief surface 95 oriented at relief angle $\beta_R$.

The preferred process of the present invention comprises initially forming the first relief surfaces by grinding the entire thickness of the cutting profile surface at a relief angle $\beta_R$. For cutting blades having a protuberant portion, second cutting profile surface portion 82 is ground at relief angle $\beta_R$ along the entire thickness from cutting edge 62 to back face 55 to form first relief surface 95. The cutting blade is then repositioned relative to the grinding wheel and the first cutting profile surface portion 81 comprising the profile surface of the protuberant portion 80 is then ground at the same relief angle $\beta_R$ to form first relief surface 90. At this point in the process, first relief surfaces 90 and 95 extend the entire thickness of the cutting blade.

The cutting blade is again repositioned and second profile portion 82 undergoes another grinding to form second relief surface 96. This is accomplished by decreasing the relief angle by an amount of about 0.5 degrees to about 5 degrees, from $\beta_R$ to $\beta$, and feeding the grinding wheel relatively into the cutting blade by a small amount thus yielding a narrow land surface 96 of a width of about 0.025 inch (0.6350 mm) to about 0.250 inch (6.350 mm). The cutting blade is then repositioned relative to the grinding wheel and a similar narrow land surface 91 is formed on the profile 81 of protuberant portion 80. In this manner, the cutting profile surface of the cutting blade comprises two relief surfaces of different relief angles. First relief surfaces 90 and 95 now extend from a location inward of the cutting edge to the back face 55 and are oriented at first relief angle $\beta_R$ while second relief surfaces 91 and 96 extend from the cutting edge inwardly to their intersection with the second relief surfaces and are oriented at second relief angle $\beta$ which is less than first relief angle $\beta_R$.

If desired, a finishing operation, preferably an additional pass with the grinding wheel, may be performed in which the second relief surfaces may undergo a second pass with the grinding wheel to further enhance the surface characteristics thereof.

Applicants have discovered that by grinding the cutting profile surface of a profile-sharpened cutting blade according to this process, the hole which was present in previous cutting blades having a single relieved surface essentially eliminated. This is due to the addition of the second relief surface 91, 96 to the cutting profile surface. By the inclusion of this second surface of small area, grinding forces and threshold pressures are significantly reduced and there is no digging of the grinding wheel into the cutting blade. Also, since the second relief surface is narrow, there is little opportunity for normal grinding forces to build when the blade is traversed relative to the grinding wheel, and hence, blade deflection is greatly diminished. Furthermore, due to the reduced area of the second relief surface, the present inventive process also results in a smaller built-up edge or burr being formed on the cutting edge.

It is to be understood that although the present process has been illustrated with respect to a profile-sharpened cutting blade having a protuberant portion, the present inventive method is also applicable to those blades having no protuberant portion such as the cutting blades of FIGS. 3–5 or 11–13. Applicants have found that profile-sharpened cutting blades, with or without a protuberant portion, sharpened in accordance to the present invention also experience longer service life due to the increased relief angle of the first relief surface which allows for an enhanced flow of chips away from the cutting edge thus better preserving the actual cutting surfaces on the blade.

The present invention is not limited to the type of blades disclosed in the above discussion of FIGS. 6, 7, 9, and 10. Any profile-sharpened cutting blades such as the types discussed in previously mentioned commonly assigned U.S. Pat. No. 4,260,299 and commonly assigned copending application Ser. No. 036,312 may be sharpened in accordance with the steps outlined above.

Figure 11:
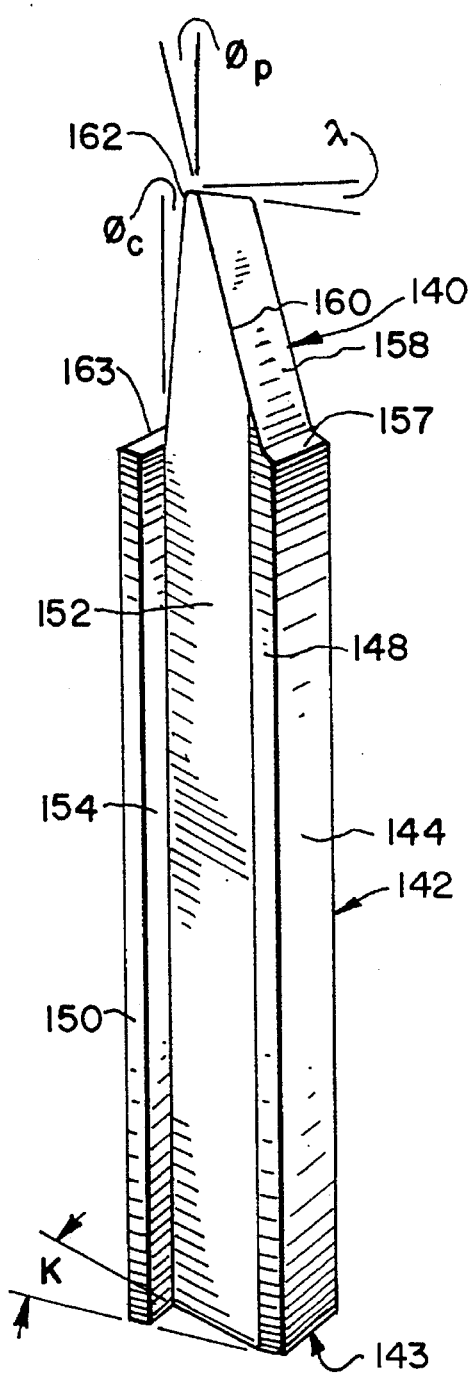
FIG. 11 is an isometric view of an alternative stick-type cutting blade which may be sharpened according to the present inventive process.
Figure 13:
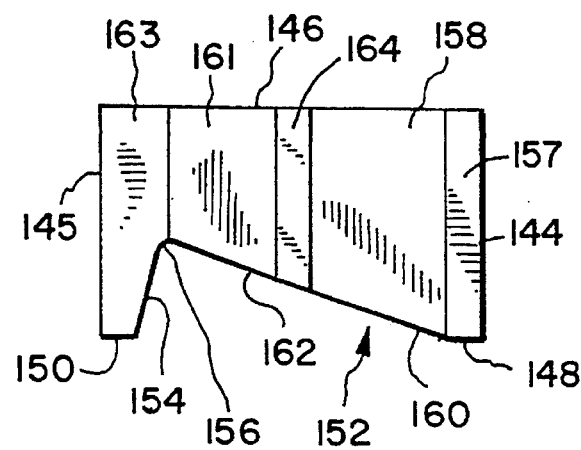
FIG. 13 is a top view of the cutting blade shown in FIG. 11.
Figure 12:
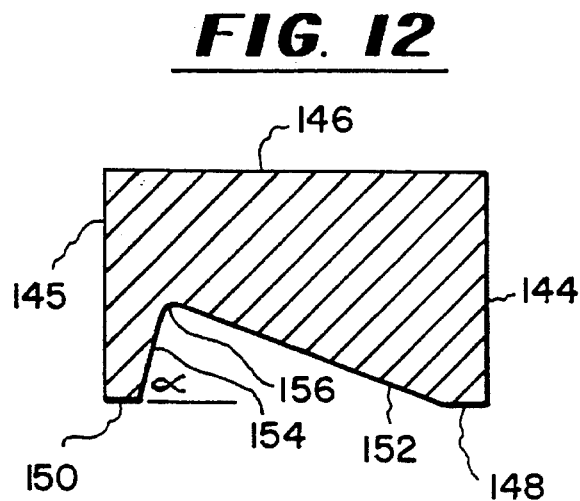
FIG. 12 is a cross-sectional view of the cutting blade shown in FIG. 11.

FIGS. 11–13 illustrate a cutting blade as disclosed by previously discussed U.S. Ser. No. 036,312. The cutting blade has no separate base and cutting end portions as in the type of cutting blade shown in FIGS. 3 or 7 for example. Instead, the cutting blade is formed from bar stock material such as M2 high speed steel and comprises a cutting end 140 integral with a shank 142 with the shank being of a uniform cross-section (see FIG. 12) along its entire length from shoulders 157 and 163 to end 143. Prior to forming the cutting end 140, the cutting blade blank has the uniform cross-section completely along its length and cutting and clearance surfaces may be formed at either end of the cutting blade blank. The cutting end 140 and shank 142 comprise a front surface including a rake surface 152 and back surface 146. The blade shank comprises a pair of opposing side surfaces 144 and 145, a pair of mounting surfaces 148 and 150, and connecting surface 154. Rake surface 152 and connecting surface 154 generally form a groove extending the length of the cutting blade shank 142. Preferably, a generally radius portion 156 is provided at the intersection of the rake surface 152 and connecting surface 154.

The cutting blade may also include includes a slot extending through the rake face 152 along the length of the blade in the same manner as is shown at 68 in FIG. 3. The face of the slot is oriented at a rake angle differing from angle K and forms a secondary cutting edge at the intersection of the slot with clearance profile surface 161. The secondary cutting edge cuts a portion of the bottom of a tooth slot as well as a portion of the flank opposite that being cut by cutting edge 160.

The cutting end 140 comprises pressure or cutting side surface 158, clearance side surface 161, and top surface 164. It is to be understood that the term "top surface" is being used for convenience purposes only and is not intended to indicate a particular orientation of the cutting blade. Cutting edge 160 is formed by the intersection of cutting side surface 158 with rake surface 152 and clearance edge 162 is formed by the intersection of clearance side surface 161 with rake surface 152. As seen in FIG. 11, top surface 164 is relieved from front to back, that is from the front surface of the cutting blade toward back surface 146, as shown by angle $\lambda$. Cutting edge 160 is oriented at pressure angle $\phi_P$ with respect to side 144 and clearance edge 162 is oriented at clearance angle $\phi_C$ with respect to side 145. A protuberant portion as shown in FIGS. 6 and 7 may be included adjacent top surface 164.

Mounting surfaces 148 and 150 are located adjacent respective side surfaces 144 and 145 and with these side surfaces form front corners on the cutting blade. The presence of these two mounting surfaces 148 and 150 provide for enhanced support and stability when the cutting blade is mounted in a cutter head by reducing or eliminating twisting of the cutting blade due to the forces encountered during cutting of a workpiece. Mounting surfaces 148 and 150 extend the length of the cutting blade up to their intersection with cutting edge 160 and clearance edge 162 respectively.

Rake surface 152 is oriented at rake angle K (which is usually about 10 degrees to about 30 degrees) with respect to the mounting surfaces 148 and 150. Preferably, mounting surface 150 and connecting surface 154 end at shoulder 163 and do not intersect clearance edge 162. In other words, it is preferred that the clearance edge 162 terminate at its intersection with the radiused portion 156. This provides sufficient clearance between the cutting region of the blade and the groove in the front of the blade such that chip packing in the groove is minimized and any chips which may pack in the groove will not interfere with the cutting process.

Rake surface 152 extends, at rake angle K, from first mounting surface 148 generally toward second mounting surface 150 such that a rake surface relieved away form the cutting edge 160 is formed on the cutting blade. Connecting surface 154 extends from mounting surface 150 generally toward back surface 146 to intersect with rake surface 152 and is oriented at an angle $\alpha$ with respect to mounting surface 150. Angle $\alpha$ is preferably no greater than about ninety (90) degrees since angles in excess of about ninety degrees result in the distance between side surface 145 and radius portion 156 being significantly less than the width of mounting surface 150 which is structurally undesirable. Preferably, rake surface 152 and connecting surface 154 are substantially perpendicular to one another. The orientation of connecting surface 154 preferably is such that regardless of the rake angle K, surfaces 152 and 154 are substantially perpendicular.

The present inventive process is applicable to the cutting blade of FIG. 11 in the same manner as previously discussed with regard to FIG. 9 and reference is made to that discussion above. Although the uniform cross-section body of the cutting blade of FIG. 11 is markedly different from the cutting blade of FIGS. 3 or 7 having a base portion and cutting end portion, the cutting side profile and clearance side profile do not change from the one type of cutting blade to the other.

The cutting profile surface 158, with or without a protuberant portion, is ground to form two relief surfaces oriented at different angles with respect to either side surface 144 or 145. A first relief surfaces is formed, preferably by grinding, over the entire thickness of the cutting profile surface from cutting edge 160 to back face 146 at a first relief surface angle. If a protuberant portion is included on the cutting blade, the cutting blade is then repositioned relative to the grinding wheel and the protuberant portion is then ground at the same first relief surface angle. At this point in the process, the first relief surface extends the entire thickness of the cutting blade.

The cutting blade is again repositioned and the cutting profile surface 158 near the cutting edge 160 undergoes another grinding to form a second relief surface. This is accomplished by decreasing the relief angle by an amount of about 0.5 degrees to about 5 degrees and feeding the grinding wheel relatively into the cutting blade by a small amount thus yielding a narrow land surface of a width of about 0.025 inch (0.6350 mm) to about 0.250 inch (6.350 mm) adjacent the cutting edge 160. If a protuberant portion is present, the cutting blade is then repositioned relative to the grinding wheel and a similar narrow land surface is formed on the protuberant portion. In this manner, the cutting profile surface of the cutting blade comprises two relief surfaces of different relief angles. The first relief surface now extends from a location inward of the cutting edge 160 to the back face 146 and is oriented at first relief angle while the second relief surface extends from the cutting edge 160 inwardly to its intersection with the second relief surfaces. The second relief angle is less than first relief angle.

If desired, a finishing operation, preferably an additional pass with the grinding wheel, may be performed in which the second relief surfaces may undergo a second pass with the grinding wheel to further enhance the surface characteristics thereof.

It is also to be understood that the present process may be carried out by grinding first cutting surface portion 81 before grinding second cutting surface profile portion 82. See FIG. 9.

Although the present invention has been illustrated with a cutting blade as shown in FIGS. 6 and 7 which is for cutting the outside flank of a tooth slot in a clockwise direction rotating cutter (left-hand cutter), or, for cutting the inside flank of a tooth slot in a counter-clockwise direction rotating cutter (right-hand cutter), this particular blade is for purposes of illustration only and is not to be construed as a limitation of the present invention. The inventive process in equally applicable to any profile-sharpened cutting blade regardless of the particular tooth flank to be cut or the direction of cutter rotation.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of sharpening a cutting blade of the profile-sharpened type made from bar stock, said cutting blade comprising a cutting end integral with a shank with said shank having a length and being of a uniform cross-section along said length, said cutting end and shank comprising a front surface including a rake surface and a back face, said shank comprising opposed side surfaces, said cutting end further including a top surface and a cutting profile surface extending between said front rake surface and said back face, the intersection of said front rake face and said cutting surface defining a cutting edge, said method comprising:

forming first and second relief surfaces on said cutting profile surface by removing stock material from said cutting surface, said first relief surface extending from a location inward of said cutting edge to said back face with said first relief surface being oriented at a first relief angle with respect to one of said opposed side surfaces, said second relief surface extending from said cutting edge to said location inward of said cutting edge with said second relief surface being oriented at a second relief angle with respect to said one of said opposed side surfaces, said second relief angle being less than said first relief angle.

2. The method of claim 1 wherein said forming comprises grinding.

3. The method of claim 1 further including a finishing operation performed on said second relief surface to further enhance the surface characteristics thereof.

4. The method of claim 3 wherein said finishing operation comprises grinding.

5. The method of claim 1 wherein said cutting profile surface includes a protuberant portion adjacent said top surface and extending between said front rake surface and said back face, said first and second relief surfaces being formed on a profile surface of said protuberant portion.

6. The method of claim 1 wherein said cutting blade further includes a slot extending in a lengthwise direction through said front rake face, said slot intersecting a clearance profile side with a secondary cutting edge being defined by the intersection of said slot and said clearance profile side.

7. The method of claim 1 wherein said front surface further includes a connecting surface, a first mounting surface located adjacent one of said opposed side surfaces, and a second mounting surface located adjacent the other of said opposed side surfaces, each of said first and second mounting surfaces forming a corner with its respective adjacent side surface, said rake surface and said connecting surface being between said mounting surfaces.

8. A method of sharpening a profile-sharpened cutting blade of the type made from bar stock, said cutting blade comprising a cutting end integral with a shank with said shank having a length and being of a uniform cross-section along said length, said cutting end and shank having a front surface including a rake surface and a back face, said shank comprising opposed side surfaces, said cutting end further including a top surface and a cutting profile surface extending between said front rake surface and said back face, the intersection of said front rake face and said cutting surface defining a cutting edge, said cutting surface further including a protuberant portion adjacent said top surface and extending from said front rake surface to said back face, said method comprising:

forming a first relief surface on said cutting profile surface by grinding, said first relief surface extending from a location inward of said cutting edge to said back face with said first relief surface being oriented at a first relief angle with respect to one of said opposed side surfaces, forming a second relief surface on said cutting profile surface by grinding, said second relief surface extending from said cutting edge to said location inward of said cutting edge with said second relief surface being oriented at a second relief angle with respect to said one of said opposed side surfaces, said second relief angle being less than said first relief angle.

9. The method of claim 8 wherein said cutting blade further includes a slot extending in a lengthwise direction through said rake surface, said slot intersecting a clearance profile surface with a secondary cutting edge being defined by the intersection of said slot and said clearance profile surface.

10. The method of claim 8 wherein said second relief angle is about 0.5 degree to about 5.0 degrees less than said first relief angle.

11. The method of claim 8 wherein said second relief surface is of a width of about 0.025 inch to about 0.250 inch.

12. The method of claim 8 further including an additional grinding pass over said second relief surface to further enhance the surface characteristics thereof.

13. The method of claim 8 wherein said grinding is effected by a grinding wheel comprising an inner conical portion and an adjacent outer narrow substantially flat surface.

14. A profile-sharpened cutting blade for cutting gears and the like, said cutting blade being formed from bar stock and comprising:

a cutting end integral with a shank with said shank having a length and being of a uniform cross-section along said length, said cutting end and shank having a front surface comprising a rake surface and a back face, said shank comprising opposed side surfaces, said cutting end further including a top surface and a cutting profile surface extending between said front rake surface and said back face, the intersection of said front rake surface and said cutting profile surface defining a cutting edge, said cutting profile surface comprising first and second relief surfaces, said first relief surface extending from a location inward of said cutting edge to said back face with said first relief surface being oriented at a first relief angle with respect to one of said opposed side surfaces, said second relief surface extending from said cutting edge to said location inward of said cutting edge with said second relief surface being oriented at a second relief angle with respect to said one of said opposed side surfaces, said second relief angle being less than said first relief angle.

15. The cutting blade of claim 14 wherein said cutting profile surface includes a protuberant portion adjacent said top surface and extending between said rake surface and said back face, said first and second relief surfaces being located on a profile surface of said protuberant portion.

16. The cutting blade of claim 14 wherein said cutting blade further includes a slot extending in a lengthwise direction through said rake surface, said slot intersecting a clearance profile side with a secondary cutting edge being defined by the intersection of said slot and said clearance profile side.

17. The cutting blade of claim 14 wherein said second relief angle is about 0.5 degree to about 5.0 degrees less than said first relief angle.

18. The cutting blade of claim 14 wherein said second relief surface is of a width of about 0.025 inch to about 0.250 inch.

19. The cutting blade of claim 14 wherein said front surface further includes a connecting surface, a first mounting surface located adjacent one of said opposed side surfaces, and a second mounting surface located adjacent the other of said opposed side surfaces, each of said first and second mounting surfaces forming a corner with its respective adjacent side surface, said rake surface and said connecting surface being between said mounting surfaces.

20. The cutting blade of claim 19 wherein said rake surface extends at rake angle K from said first mounting surface generally toward said second mounting surface, said rake surface being relieved away form said cutting edge, said connecting surface extends from said second mounting surface generally toward said back surface at an angle α of no greater than about ninety degrees with respect to said second mounting surface and intersects said rake surface thereby forming a groove along said length of said cutting blade, said rake surface and said connecting surface being substantially perpendicular to one another with their intersection being a generally radiused surface.

* * * * *